United States Patent
Melrose et al.

(10) Patent No.: US 8,091,574 B2
(45) Date of Patent: Jan. 10, 2012

(54) BURSTING DISC ASSEMBLY

(75) Inventors: Graeme Melrose, Newcastle upon Tyne (GB); Russell Trotter, South Shields (GB)

(73) Assignee: Elfab Limited, Tyne and Wear (GB)

( * ) Notice: Subject to any disclaimer, the term of this patent is extended or adjusted under 35 U.S.C. 154(b) by 959 days.

(21) Appl. No.: 12/088,102

(22) PCT Filed: Sep. 27, 2006

(86) PCT No.: PCT/GB2006/003599
§ 371 (c)(1),
(2), (4) Date: Mar. 26, 2008

(87) PCT Pub. No.: WO2007/036719
PCT Pub. Date: Apr. 5, 2007

(65) Prior Publication Data
US 2008/0202595 A1    Aug. 28, 2008

(30) Foreign Application Priority Data

Sep. 29, 2005 (GB) .................................. 0519834.6

(51) Int. Cl.
*F16K 17/16* (2006.01)
*F16K 17/40* (2006.01)
(52) U.S. Cl. ............... 137/15.18; 167/68.18; 167/68.22; 167/68.23; 167/68.26; 167/910; 220/89.2
(58) Field of Classification Search ............... 137/15.18, 137/15.19, 68.19, 68.22, 68.23, 68.25, 68.26, 137/68.27, 68.28, 68.18, 910; 220/89.2
See application file for complete search history.

(56) References Cited

U.S. PATENT DOCUMENTS

| 2,387,353 | A | | 10/1945 | Raymond | |
|---|---|---|---|---|---|
| 3,123,250 | A | | 3/1964 | Lemmer | |
| 3,463,351 | A | | 8/1969 | Mills | |
| 3,467,120 | A | | 9/1969 | Hill et al. | |
| 3,526,336 | A | | 9/1970 | Wood | |
| 3,722,734 | A | * | 3/1973 | Raidl, Jr. ...................... | 220/89.2 |
| 4,102,469 | A | * | 7/1978 | Shegrud et al. .............. | 220/89.2 |
| 4,278,181 | A | * | 7/1981 | Wood et al. ................. | 137/68.26 |
| 4,345,611 | A | * | 8/1982 | Ikeda et al. ................. | 137/68.29 |
| 4,434,905 | A | * | 3/1984 | Ou et al. ...................... | 220/89.2 |
| 4,591,520 | A | | 5/1986 | Brodie | |
| 4,630,630 | A | * | 12/1986 | Reynolds et al. .......... | 137/68.23 |
| 4,819,823 | A | * | 4/1989 | Kadakia et al. ............. | 220/89.2 |
| 5,022,424 | A | | 6/1991 | Reynolds et al. | |
| 5,058,413 | A | | 10/1991 | Muddiman | |
| 5,063,958 | A | * | 11/1991 | Wisneskie et al. ......... | 137/68.27 |

(Continued)

FOREIGN PATENT DOCUMENTS

EP    0867648    9/1998
(Continued)

*Primary Examiner* — John Rivell
(74) *Attorney, Agent, or Firm* — Stites & Harbison PLLC; Marvin Petry

(57) ABSTRACT

The bursting disc assembly has a primary bursting disc (10) and a secondary bursting disc (20) immediately behind and supporting the primary bursting disc. Each of the said discs (10,20) is made of metal and is gas impermeable, and the bursting strength of the assembly is derived from both of the bursting discs acting in combination. The primary and secondary bursting discs are in contact over the whole of the operating area of the disc, and are shaped together as a pair. The materials of the two discs can be chosen suitably for their functions. The primary disc is for example corrosion-resistant.

21 Claims, 2 Drawing Sheets

U.S. PATENT DOCUMENTS

| | | | |
|---|---|---|---|
| 5,377,716 A * | 1/1995 | Farwell et al. | 137/68.27 |
| 5,755,249 A | 5/1998 | Muddiman | |
| 6,367,203 B1 | 4/2002 | Graham et al. | |
| 6,378,544 B1 | 4/2002 | DiBello | |
| 6,959,828 B2 | 11/2005 | Eijkelenberg et al. | |
| 7,735,671 B2 * | 6/2010 | Eijkelenberg et al. | 220/89.2 |
| 7,870,865 B2 * | 1/2011 | Mattison | 137/68.25 |
| 2001/0011471 A1 | 8/2001 | Cullinane et al. | |
| 2005/0103786 A1 | 5/2005 | Eijkelenberg et al. | |
| 2005/0161082 A1 * | 7/2005 | Farwell et al. | 137/68.25 |

FOREIGN PATENT DOCUMENTS

| | | |
|---|---|---|
| GB | 1004199 | 9/1965 |
| GB | 2051959 | 1/1981 |
| GB | 2 307 654 | 6/1997 |
| WO | WO 03/031853 | 4/2003 |
| WO | WO 2005/054731 | 6/2005 |

* cited by examiner

BURSTING DISC ASSEMBLY

FIELD OF THE INVENTION

This invention relates to safety pressure relief devices and, more particularly to bursting disc assemblies, which are designed to rupture reliably at a predetermined pressure differential. This invention also relates to a method of manufacture of a bursting disc assembly, to the use of a bursting disc assembly and to an over-pressure detector comprising a bursting disc assembly.

BACKGROUND OF THE INVENTION

It is well known in the chemical engineering and pharmaceutical industries to provide pressure relief devices for protecting pressure systems from over pressurisation. One such pressure relief device is a bursting disc, for example as disclosed in WO 03/031853. When the pressure at one side of the disc rises above a predetermined design pressure, the disc ruptures thereby releasing pressure from the system. One such typical application is on reaction vessels and chambers in the chemical, pharmaceutical and food industries.

It is also known in the art to provide a bursting disc in an over-pressure detector. WO 2005/054731 discloses a bursting disc type over-pressure detector having a bursting disc clamped at its flange between inlet and outlet pipe members. At the vent side of the device in WO 2005/054731 is mounted a magnet, its movement sensed by a non-invasive sensor. When the pressure at one side of the disc rises above a predetermined design pressure, the disc ruptures thereby releasing pressure from the system and moving the magnet relative to the sensor. The signal produced by the sensor changes, signalling that the bursting disc has ruptured.

Bursting discs are often used in equipment housing processes that use corrosive materials, e.g. sulphuric and nitric acids, chromic acid, phosphoric acid, trichloroethylene, etc. It is known that bursting discs can be made from corrosion-resistant materials where they are intended to protect a process utilising corrosive chemicals. The materials of construction of such bursting discs are generally selected on a case-by-case basis depending on the particular applications.

To manufacture a bursting disc for a particular application, the specific material (both material type and thickness) must be purchased and the manufacturing process for the disc must be adjusted to suit. Discs for arduous chemical environments are made of a solid material, which is chemically compatible with the process chemistry. As these materials are often of a very specialised nature they are usually very expensive and available only in certain forms, which may not be suitable for bursting disc manufacture. These factors increase the delivery lead-time and costs of the bursting disc.

A cheaper alternative to making bursting discs from expensive corrosion resistant materials is to provide a thin coating on the process contact face of the disc, in order to provide a barrier between the chemical process and the structure of the disc. GB-A-2307654 shows an example of a deposited and sintered PTFE coating. This coating is thin and flexible and conforms to the surface of the bursting disc. It provides no mechanical strength, and for all practical considerations, the structure of the disc underneath the coating carries all loads generated by the applied pressure.

Similarly, US 2001/0011471 discloses a liner covering and sealing an opening in a rupturable portion of a rupture disc. In US 2001/0011471 the liner is said to be lighter and more flexible than the material of the rupture disc. It is not apparent that this liner has any mechanical strength.

The disadvantage of these coatings or liners is that, as they are thin, they are liable to mechanical damage and pin-holing. Any pin-holing of the coating allows the corrosive fluid to contact the structural part of the disc and gradually attack it, lowering its strength. This is a significant weakness with this type of design.

Attempts have also been made to produce twin disc assemblies for use in pressurised systems containing corrosive fluids. The present inventors have now analysed these as follows. For example, U.S. Pat. No. 4,591,520 discloses a twin disc assembly in which the primary disc, which is in contact with the high pressure side of the system, is made of graphite and is backed up by a supporting metal disc. However, such a system is expensive, due to the requirement for a special form of graphite that has a great strength and reliability. The two discs forming the assembly must also be shaped using different procedures, and thus it is not possible to produce discs that conform exactly. This lack of conformity means that the discs do not operate sympathetically under pressure. In particular, wrinkling or creasing of one of the discs may occur when the discs form part of a reverse-acting assembly. Thus, the reliability of the assembly is impaired. The reliability of the assembly is also impaired by the fact that it is not possible to introduce regions of weakness in graphite in a dependable manner. Furthermore, the mechanical failure of graphite is in general less predictable than that of materials more commonly used in the manufacture of bursting discs.

Twin disc assemblies comprising two metal bursting discs are also known. However, the examples disclosed in prior art documents such as U.S. Pat. No. 6,959,828 and EP0867648 are unsuited for use in pressurised systems containing corrosive fluids, since the discs in these assemblies contain through-thickness slots or cuts and thus allow corrosive fluid to penetrate into the assembly. Furthermore, neither of these documents discloses any means for ensuring that the discs operate sympathetically under pressure. Sympathetic operation of the discs is particularly important when the discs form part of a reverse-acting assembly, since any wrinkling or creasing of the discs reduces the reliability of the assembly.

SUMMARY OF THE INVENTION

The present invention has been devised in order to address one or more of the above problems, preferably to ameliorate, avoid or even overcome one or more of the above problems. According to the present invention, there is provided a bursting disc assembly having a primary bursting disc and a secondary bursting disc immediately behind and supporting the primary bursting disc, wherein the strength of the assembly is derived from both of the bursting discs acting in combination.

The present invention thus provides a mechanically robust primary bursting disc operated in close conjunction with a secondary bursting disc, such that their combined strength resists the applied pressure. While each of the primary and secondary discs is a solid gas-impermeable body without aperture in the operating region and is capable of supporting itself and is capable of resisting differential gas pressure, it may be that either the primary or secondary disc, or each of them, operating individually, would not be able to support the design pressure. It is their combined strength that enables the bursting disc assembly to support the design pressure.

The present invention is applicable in principle to all forms of bursting disc, for example to any of
 a forward acting unscored disc,
 a forward acting cross-scored disc,
 a reverse acting cross-scored disc,
 a forward acting peripherally scored disc,
 a reverse acting peripherally scored disc.

A benefit of the invention is that the first disc (made for example from a corrosion resistant material) is of sufficient strength and thickness to be mechanically robust and be resistant to physical damage and pin-holing. This increases the reliability of the chemically resistive barrier provided by the primary disc, and therefore of the bursting disc as a whole. Furthermore, as the primary bursting disc need not be of sufficient strength to support the design pressure of the assembly, the primary bursting disc may be thinner in the axial direction than conventional bursting discs made from expensive corrosion-resistant materials.

The secondary bursting disc conforms to the shape of the primary bursting disc, at least in the operating area of the discs. The secondary bursting disc may overlie the whole of the operating area of the primary bursting disc. The two discs are preferably in contact over substantially the whole of the operating area. The operating area is the region exposed to the pressurised fluid in use.

The material from which the primary bursting disc is made may be different to the material from which the secondary bursting disc is made. A suitable thickness of the material of the primary disc is at least 0.1 mm, and the preferred range is 0.1 to 2 mm. Normally, a bursting disc assembly has primary and secondary discs made from different materials. However, a bursting disc assembly having two discs made of the same material is not excluded. When the bursting disc assembly is used in equipment housing a process which uses corrosive fluid, e.g. corrosive gas or liquid, the primary bursting disc should be made of a material which is resistant to the corrosive material which may contact the primary bursting disc. Suitable corrosion-resistant materials are, for example, silver, gold, platinum, hastelloy, tantalum, monel and inconel. The secondary bursting disc may therefore be made from a readily available standard material, such as, but not limited to, stainless steel. The material of the secondary bursting disc need not, therefore, be resistant to the corrosive materials which may contact the primary bursting disc. The thickness of the secondary disc is typically at least 0.1 mm and is also preferably in the range 0.1 to 2 mm.

The primary and secondary discs may be joined together by clamping them together, e.g. at their installation site, or they may be bonded to each other, e.g. by means of adhesive or by welding (e.g. seam welding or spot welding).

The bursting disc assembly may have an annular flange portion. This may comprise an annular flange portion of the primary bursting disc and an annular flange portion of the secondary bursting disc. This flange portion allows the bursting disc assembly to be clamped between pipe flanges.

The operating area of the disc assembly may comprise a dome portion. This may be a dome portion of the primary bursting disc and a dome portion of the secondary bursting disc. The dome portion is arranged such that it is convex or concave when viewed from the direction of applied pressure. Thus the present invention is applicable to both forward-acting bursting discs and reverse-acting bursting discs.

In one particular design of bursting disc to which the invention may be applied, at the edge of the dome portion, adjacent the flange portion of the bursting disc assembly, there may be provided a transition portion. This may comprise a transition portion of the primary bursting disc and a transition portion of the secondary bursting disc. The transition portion of each bursting disc may comprise a linear extent (as seen in axial cross-section) extending from the annular flange portion to the dome portion of each bursting disc. In this way, the linear extent of the transition portion defines a frusto-cone. The join of the linear extent of the transition portion of the primary bursting disc to the annular flange portion of the primary bursting disc may be an angular join (not radiussed). The same may be true for the equivalent join of the secondary bursting disc. The join of the linear extent of the transition portion of the primary bursting disc to the dome portion of the primary bursting disc may be a radiussed join (curved join) or an angle. Again, the same may be true for the equivalent join of the secondary bursting disc.

Preferably the join between the linear extent of the transition portion and the dome portion is radiussed, and the join between the linear extent of the transition portion and the flange portion is not radiussed.

In the practice of this invention, there may be a line of weakness (rupture line) formed in each of the primary and secondary bursting discs. Each of these lines of weakness may be a score line. The line of weakness facilitates a controlled opening of the bursting disc assembly when the pressure applied to the bursting disc assembly exceeds the design pressure of the assembly.

Preferably the line of weakness formed in the primary bursting disc is axially aligned with the line of weakness formed in the secondary bursting disc. In the case of a domed disc, e.g. a reverse-acting peripherally scored domed disc, a preferred position for the line of weakness is around the dome portion in the linear extent of the transition region between the dome portion and the flange portion, such a line being in a position of relatively high stress, and providing maximum free flow area for fluid subsequent to tearing of the collapsed reversed dome portion along the line. The lines of weakness, when score lines, in the bursting discs are preferably formed on the vent side of each bursting disc.

The score line is typically an arc, leaving a piece of unscored material to act as an anchor for the disc petal. The present invention also provides the use of a bursting disc assembly in an application wherein the primary bursting disc may contact corrosive fluid (gas or liquid) and wherein the primary bursting disc is resistant to said fluid.

The invention may be particularly suited to larger discs where the issues of cost, lead time and material availability result in significant practical difficulties in economical manufacture of a bursting disc from a single piece of corrosion resistant material.

It is important that the pair of discs operate sympathetically. To this end the discs may be manufactured simultaneously to ensure that they have a complementary shape allowing loads and stresses to be shared proportionally between the discs. It is recommended that the discs be formed, for example be given a dome shape, together as a pair, then separated and individually scored, and then re-united. It is also recommended that the angular orientation of the separate discs be noted (e.g. by a notch in the periphery, a location pin or indent or an alignment mark) so that when re-united good contact between the discs is assured, e.g. at the complete dome region.

In one aspect the invention provides a bursting disc assembly having:
a primary bursting disc, and
a secondary bursting disc immediately behind and supporting said primary bursting disc,
wherein each of the said bursting discs is made of metal and is gas impermeable, and the bursting strength of the assembly is derived from both of the bursting discs acting in combination.

Particularly the invention is advantageous when applied to a reverse-acting disc assembly, in which the convex face of the dome structure of the assembly faces towards the high pressure side of the system in which it is used. A reverse-acting bursting disc has a primary failure mode in which the disc reverses, i.e. the dome shape collapses through the plane of the peripheral flange. Secondary failure is caused by rupture of the disc, caused for example by a knife or teeth arranged behind the disc. In the present invention it has been surprisingly found that two discs which act together in combination, especially two discs which have no intervening layer between them and having close conformity to each other over the operating area, act in a consistent and reliable manner in the reverse-acting mode, in a similar manner to a single disc. That is to say, it appears that the primary failure mode of the two disc assembly of the invention is surprisingly reproducible, so that predictable and consistent bursting pressure of the disc assemblies can be achieved, which is essential for discs which are manufactured and sold in large numbers. This is particularly thought to be achieved using the method of manufacture in which the two discs are formed (domed) together as a pair. For this purpose, it is also important that the score lines of the two discs are axially aligned.

The present invention also provides an over-pressure detector comprising a bursting disc assembly.

INTRODUCTION OF THE DRAWINGS

Further explanation of the invention, and an embodiment of it, will now be described by way of non-limitative example, with reference to the accompanying drawings, in which:

FIG. 1 is a sectional view of a reverse-acting bursting disc assembly embodying the invention, showing the primary and secondary discs, and FIG. 2 is a close-up view of a portion X of FIG. 1, showing the primary and secondary discs of the bursting disc assembly.

Preferred Embodiment

DESCRIPTION OF THE EMBODIMENTS

Figure 1:
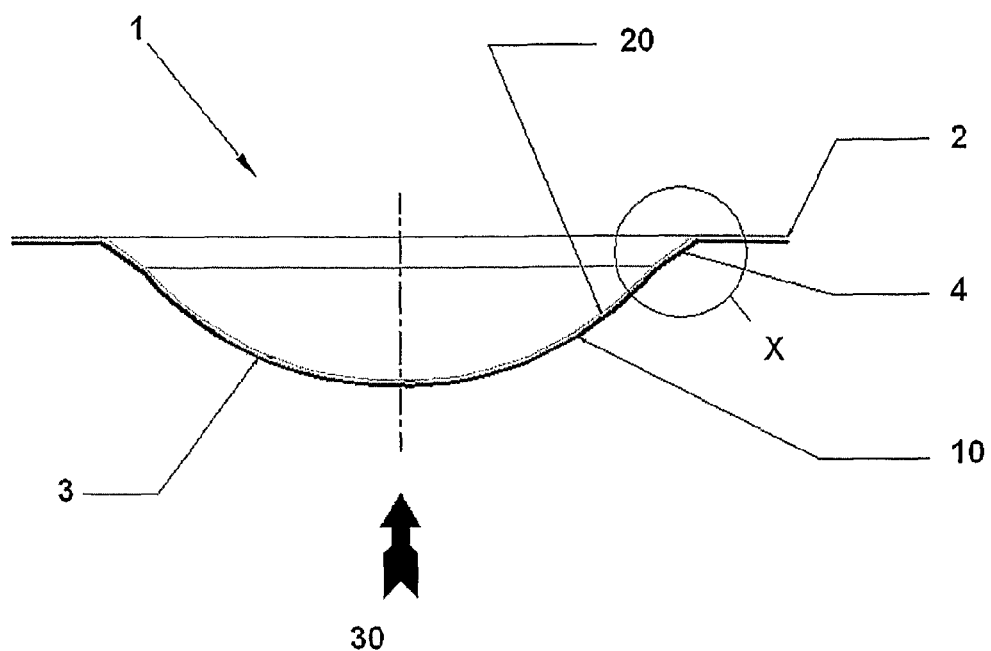

Two embodiments of a bursting disc assembly according to the present invention will now be described with reference to FIGS. 1 to 4.

The bursting disc assembly 1 according to the invention comprises a primary bursting disc 10 and a secondary bursting disc 20. The secondary bursting disc 20 is arranged immediately behind the primary bursting disc 10, such that the strength of the assembly 1 is derived from both the bursting discs 10, 20 acting in combination. As can be seen in the drawings, there is no material intervening between the two discs. Arrow 30 in each of FIGS. 1 to 4 indicates the direction of the pressure applied to the bursting disc assembly as a load.

Each of the bursting discs 10, 20 is of a mechanically substantial thickness having a thickness in the range of 0.1 to 2.0 mm. By way of example, for a 250 mm nominal bore diameter disc of 6.0 bar g (0.6 MPa) burst pressure, the primary disc is 0.35 mm hastelloy, and the secondary disc is 0.7 mm stainless steel.

The secondary bursting disc 20 conforms to the shape of the primary bursting disc 10 across the whole of the operating area of the disc 10. They are in contact over the whole of this area.

The material from which the primary bursting disc 10 is made is different to the material from which the secondary bursting disc 20 is made. The bursting disc assembly 1 shown is to be installed in a suitable location in an application which employs materials which would otherwise be corrosive to the material of conventional bursting discs, e.g. corrosive gases or corrosive liquids, so the material of the primary bursting disc 10 is a corrosion-resistant material. The material of the secondary bursting disc 20 is readily available stainless steel.

Joining the primary and secondary discs may be by way of a contact adhesive between the separate discs or by welding (spot or seam). In this embodiment of the invention, the bursting disc assembly has an annular flange portion 2, comprising a planar annular flange portion 12 of the primary bursting disc 10 and a planar annular flange portion 22 of the secondary bursting disc 20. The bursting disc assembly of the invention is intended to be installed in a suitable bursting disc holder between pipe flanges in a conventional manner, i.e. the bursting disc assembly 1 is clamped between pipe flanges by this flange portion 2.

The bursting disc assembly further has a concave/convex dome portion 3, comprising the dome portion 13 of the primary bursting disc 10 and the dome portion 23 of the secondary bursting disc 20.

Figure 2:
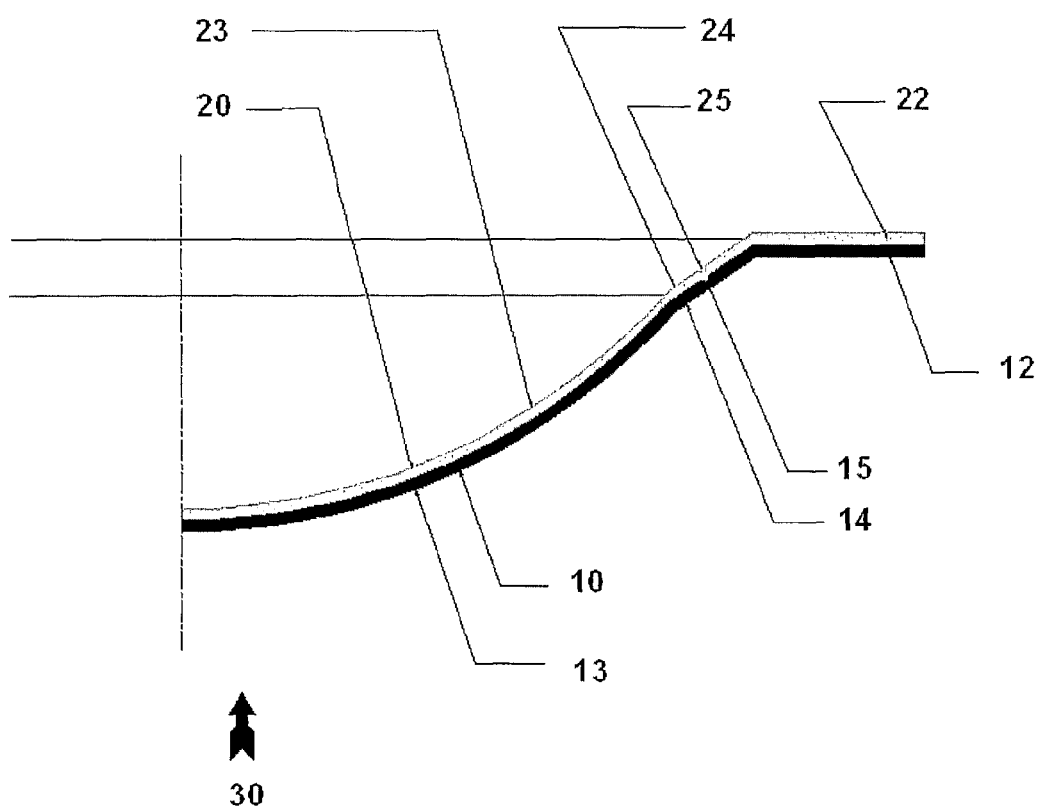

FIGS. 1 and 2 show an embodiment of a reverse-acting bursting disc assembly, where the dome portion 3 is arranged such that it is convex when viewed from the direction of applied pressure. This direction is illustrated by arrow 30. The concave side of the dome is on what is conventionally termed the vent side of the bursting disc assembly.

Figure 3:
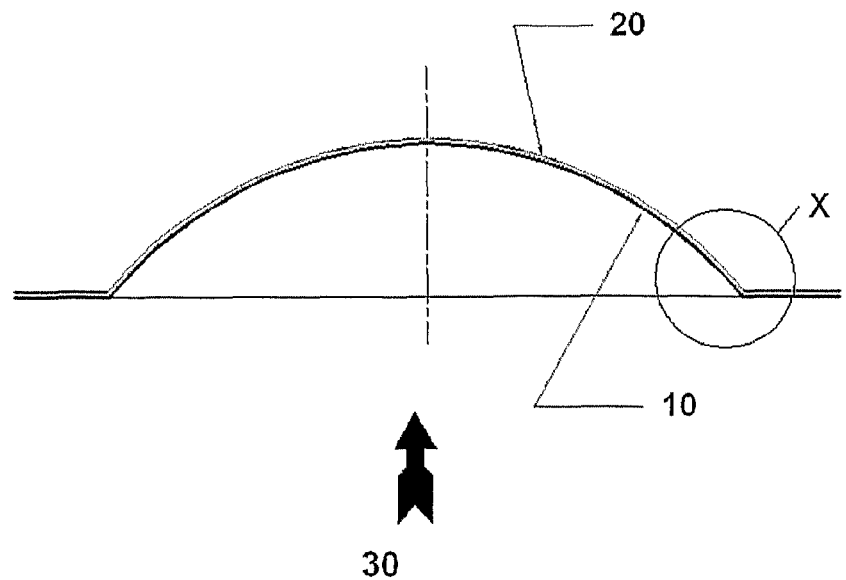
FIG. 3 is a sectional view of a forward-acting bursting disc assembly embodiment of the invention.
Figure 4:
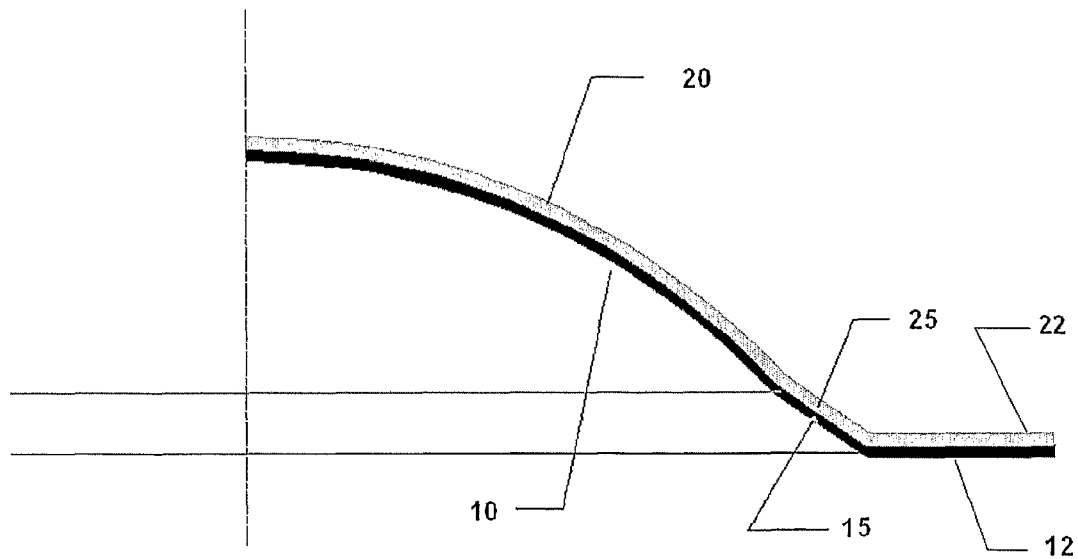
FIG. 4 is a close-up view of a portion X of FIG. 3, showing the primary and secondary discs of the bursting disc assembly.
Figure 4:

An embodiment of a forward-acting bursting disc assembly is shown in FIGS. 3 and 4. The dome portion 3 has a concave arrangement when viewed from direction of applied pressure, as illustrated by arrow 30. In this embodiment, the vent side of the bursting disc assembly is the convex side of the dome.

In the embodiment of the invention shown in FIGS. 1 and 2, a transition portion 4 is provided between the dome portion 3 and the flange portion 2 of the bursting disc assembly. The transition portion 4 of the bursting disc assembly comprises the transition portion 14 of the primary bursting disc 10 and, the transition portion 24 of the secondary bursting disc 20. The transition portion 14, 24 of each bursting disc 10, 20 comprises a linear extent extending from the annular flange portion 12, 22 to the dome portion 13, 23 of each bursting disc 10, 20 respectively. The linear extent of the transition portion 4 therefore defines a truncated cone. The join of the linear extent of the transition portion 14 of the primary bursting disc 10 to the annular flange portion 12 of the primary bursting disc 10 is an acute angle. The same is true for the equivalent join of the secondary bursting disc 20. The join of the linear extent of the transition portion 14 of the primary bursting disc 10 to the dome portion 13 of the primary bursting disc 10 is a radius. The same is true for the equivalent join of the secondary bursting disc 20. These features may also be present in the forward-acting bursting disc assembly embodiment.

In both embodiments of the invention, there is a line of weakness 15 formed in the primary bursting disc 10 and a line of weakness 25 formed in the secondary bursting disc 20. Each of these lines of weakness 15, 25 is a score line. The score lines are formed in the linear extent of the transition portion 14 of the primary bursting disc 10 and the linear extent of the transition portion 24 of the secondary bursting disc 20. The score line 15 formed in the primary bursting disc 10 is axially aligned with the score line 25 formed in the secondary bursting disc 20. The score lines in the bursting discs 10, 20 are formed on the vent side of each bursting disc 10, 20. The formation of the two score lines in the linear extent 24 is advantageous since it enables them to be accurately aligned with each other.

The bursting disc assembly of the invention has several benefits over conventional products. In particular, there may be used a reduced thickness disc of an expensive corrosion-resistant material, the cost of the bursting disc assembly equivalent in performance to a conventional corrosion-resistant disc assembly, in which whole bursting disc assembly has been made of such an expensive corrosion-resistant material, is much less.

Secondly, it may be possible to standardise on the thickness (or a selection for example of 2 to 5 thicknesses) of corrosion-resistant material, thus facilitating stock holding and reducing production lead times. The varying burst pressure requirements are then achieved by modifying the strength and/or thickness of the secondary disc.

Furthermore, since the primary bursting disc 10 is of a substantial mechanical thickness, it is not liable to pin-holing, and so the primary bursting disc 10 stops any materials from the process chemistry from contacting the secondary bursting disc 20. Therefore, the secondary bursting disc 20 may be made of a readily available material, such as stainless steel. This further reduces the cost of the bursting disc assembly while still providing the strength of an equivalent conventional corrosion-resistant disc assembly.

In use, the bursting disc assembly of FIGS. 1 and 2 may be mounted in a conventional manner, being clamped between flanges of inlet and outlet pipes. It may be combined with a magnetic detector arrangement as shown in WO 05/054731.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A bursting disc assembly having:
a primary bursting disc, and
a secondary bursting disc immediately behind and supporting said primary bursting disc,
wherein each of the said bursting discs is made of metal, is gas impermeable and has a rupture line, the rupture line of the primary bursting disc being axially aligned with the rupture line of the second bursting disc,
and wherein the bursting strength of the assembly is derived from both of the bursting discs acting in combination.

2. A bursting disc assembly according to claim 1, wherein each of the primary and secondary bursting discs has a thickness in the range 0.1 to 2 mm.

3. A bursting disc assembly according to claim 1, wherein the secondary bursting disc conforms to the shape of the primary bursting disc, at least in the operating area of the discs.

4. A bursting disc assembly according to claim 3, wherein the primary and secondary bursting discs are in contact over the whole of the operating area of the discs.

5. A bursting disc assembly according to claim 1, in which the primary and secondary discs are bonded together.

6. A bursting disc assembly according to claim 1, which is a reverse-acting bursting disc assembly.

7. A bursting disc assembly according to claim 1, wherein each said rupture line is a score.

8. A bursting disc assembly according to claim 1, wherein said rupture lines extend along the periphery of the operating area of the discs.

9. A bursting disc assembly according to claim 1, wherein the primary and secondary bursting discs are made of different materials.

10. A bursting disc assembly according to claim 1, wherein the primary bursting disc is made from silver, gold, platinum, hastelloy, tantalum, monel and inconel.

11. A bursting disc assembly according to claim 10, wherein the secondary bursting disc is made from stainless steel.

12. A bursting disc assembly according to claim 1, wherein the discs have a dome shape.

13. A bursting disc assembly according to claim 1, wherein the primary and secondary discs are shaped together as a pair.

14. A bursting disc assembly according to claim 1, made by a method including the following steps:
shaping the primary and secondary discs together as a pair,
separating said discs and creating a score in each disc individually, and
reuniting said discs.

15. A bursting disc assembly according to claim 14, wherein in said step of shaping said discs together as a pair, said discs are given a domed shape.

16. Apparatus containing corrosive fluid and having a bursting disc assembly,
said bursting disc assembly having:
a primary bursting disc, and
a secondary bursting disc immediately behind and supporting said primary bursting disc,
wherein each of the said bursting discs is made of metal, is gas impermeable and has a rupture line, the rupture line of the primary bursting disc being axially aligned with the rupture line of the secondary bursting disc,
and wherein the bursting strength of the bursting disc assembly is derived from both of said bursting discs acting in combination, wherein said apparatus, the primary bursting disc contacts corrosive fluid and wherein the primary bursting disc is resistant to said fluid.

17. An over pressure detector comprising a bursting disc assembly having:
a primary bursting disc, and
a secondary bursting disc immediately behind and supporting said primary bursting disc,
wherein each of the said bursting discs is made of metal, is gas impermeable and has a rupture line, the rupture line of the primary bursting disc being axially aligned with the rupture line of the secondary bursting disc,
and wherein the bursting strength of the assembly is derived from both of the bursting discs acting in combination,
whereby failure of the bursting disc assembly is detected as an indication of over pressure.

18. An over-pressure detector according to claim 17, wherein the interior portion of each disc in said disc assembly is dished, with the convex side of the said interior portions facing the high pressure side of the system.

19. A method of making a bursting disc assembly having:
a primary bursting disc, and
a secondary bursting disc immediately behind and supporting said primary bursting disc,
wherein each of the said bursting discs is made of metal, is gas impermeable and has a rupture line, the rupture line of the primary bursting disc being axially aligned with the rupture line of the secondary bursting disc,
and wherein the bursting strength of the assembly is derived from both of the bursting discs acting in combination,
the method comprising the step of :
shaping the primary and secondary discs together as a pair.

20. A method according to claim 19, comprising the steps of:
separating said discs after their shaping together as a pair, and creating said rupture line as a score in each disc individually, and reuniting said discs.

21. A method according to claim 19, wherein in said step of shaping said discs together as a pair, said discs are given a domed shape.

* * * * *